(12) United States Patent
He et al.

(10) Patent No.: US 11,405,970 B2
(45) Date of Patent: Aug. 2, 2022

(54) COMMUNICATION CONNECTION

(71) Applicant: SZ DJI TECHNOLOGY CO., LTD., Shenzhen (CN)

(72) Inventors: Yukun He, Shenzhen (CN); Zexun Cao, Shenzhen (CN); Jia Li, Shenzhen (CN); Dan Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 359 days.

(21) Appl. No.: 16/287,694

(22) Filed: Feb. 27, 2019

(65) Prior Publication Data
US 2019/0200408 A1     Jun. 27, 2019

Related U.S. Application Data

(63) Continuation of application No. PCT/CN2016/097627, filed on Aug. 31, 2016.

(51) Int. Cl.
*H04W 76/15* (2018.01)
*H04W 76/11* (2018.01)
*H04W 64/00* (2009.01)
*H04W 24/08* (2009.01)
*H04W 4/80* (2018.01)
*H04W 48/16* (2009.01)
*H04W 4/06* (2009.01)

(52) U.S. Cl.
CPC ............. *H04W 76/15* (2018.02); *H04W 4/06* (2013.01); *H04W 4/80* (2018.02); *H04W 24/08* (2013.01); *H04W 48/16* (2013.01); *H04W 64/003* (2013.01); *H04W 76/11* (2018.02)

(58) Field of Classification Search
None
See application file for complete search history.

(56) References Cited

U.S. PATENT DOCUMENTS

2011/0167008 A1     7/2011   King
2011/0281557 A1*   11/2011   Choi ..................... H04L 67/16
                                                                    455/411

(Continued)

FOREIGN PATENT DOCUMENTS

CN        101662667 A       3/2010
CN        102413585 A       4/2012

(Continued)

OTHER PUBLICATIONS

The World Intellectual Property Organization (WIPO) International Search Report for PCT/CN2016/097627 dated Jun. 5, 2017 7 pages.

*Primary Examiner* — Gregory B Sefcheck
*Assistant Examiner* — Srinivasa R Reddivalam
(74) *Attorney, Agent, or Firm* — Anova Law Group, PLLC

(57) ABSTRACT

A method for communication connection processing includes generating a connection message by a first terminal in response to detecting a second terminal is placed in a loading region of the first terminal. The connection message includes at least one connection identifier each corresponding to one of at least one device carried by the first terminal, and a loading flag that is configured as being valid for instructing the second terminal to establish a communication connection. The method further includes broadcasting the connection message.

20 Claims, 5 Drawing Sheets

(56) References Cited

U.S. PATENT DOCUMENTS

| | | | | |
|---|---|---|---|---|
| 2014/0369478 A1* | 12/2014 | Brutin | ............... | H04M 3/42221 |
| | | | | 379/68 |
| 2016/0012453 A1* | 1/2016 | Naqvi | ................ | G06Q 30/0205 |
| | | | | 705/7.29 |
| 2016/0128114 A1* | 5/2016 | Moy | .................... | H04W 12/06 |
| | | | | 455/434 |
| 2016/0241999 A1* | 8/2016 | Chin | ....................... | G08C 23/04 |
| 2017/0078837 A1* | 3/2017 | Liang | ....................... | H04L 67/18 |
| 2017/0201561 A1* | 7/2017 | Hongell | ............. | H04L 65/1069 |
| 2017/0227162 A1* | 8/2017 | Saika | ................... | F16M 11/041 |
| 2018/0359613 A1* | 12/2018 | Trzupek | ................ | H04W 4/021 |
| 2019/0029074 A1* | 1/2019 | Inoue | ................... | H04L 69/08 |
| 2020/0280198 A1* | 9/2020 | Kwon | ................ | H04B 5/0081 |

FOREIGN PATENT DOCUMENTS

| | | | |
|---|---|---|---|
| CN | 102624428 | A | 8/2012 |
| CN | 102789187 | A | 11/2012 |
| CN | 104066202 | A | 9/2014 |
| CN | 104320553 | A | 1/2015 |
| CN | 104571132 | A | 4/2015 |
| CN | 105100880 | A * | 11/2015 |
| CN | 105100880 | A | 11/2015 |
| CN | 105246024 | A | 1/2016 |
| CN | 105278362 | A | 1/2016 |
| KR | 1020160002150 | A | 1/2016 |

* cited by examiner

COMMUNICATION CONNECTION

CROSS-REFERENCE TO RELATED APPLICATION

This application is a continuation application of International Application No. PCT/CN2016/097627, filed on Aug. 31, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to automated control technology and, more particularly, to methods, devices, and systems for communication connection.

BACKGROUND

With the development of electronic technology and communication technology, wireless connections can be established between two or more terminal devices for data exchange. Common wireless communication technology includes Bluetooth technology, infrared technology, WiFi technology, etc. For example, data can be transferred between two smart phones over a Bluetooth connection. As another example, data can be transferred between a smart phone and a camera over a WiFi connection.

After establishing a connection between two terminal devices at the first time, the two terminal devices can be bound based on a binding function at the time of the first connection. After that, the two terminal devices can be automatically connected to each other based on the binding relationship. However, if a terminal device has already been bound to multiple other terminal devices, the terminal may not be able to establish a communication connection with an additional terminal device because a number of bound terminal devices has been reached to an upper limit.

SUMMARY

In accordance with the disclosure, there is provided a method for communication connection processing including generating a connection message by a first terminal in response to detecting a second terminal is placed in a loading region of the first terminal. The connection message includes at least one connection identifier each corresponding to one of at least one device carried by the first terminal, and a loading flag that is configured as being valid for instructing the second terminal to establish a communication connection. The method further includes broadcasting the connection message.

Also in accordance with the disclosure, there is provided a method for communication connection processing including monitoring one or more broadcasted messages each including a loading flag being invalid or valid, determining one of the one or more messages in which the loading flag has changed from invalid to valid as a connection message, and establishing a communication connection with a device indicated by a connection identifier in the connection message.

Also in accordance with the disclosure, there is provided a terminal for communication connection processing including a generating circuit configured to generate a connection message in response to detecting another terminal is placed in a loading region. The connection message includes at least one connection identifier each corresponding to one of at least one device carried by the first terminal, and a loading flag that is configured as being valid for instructing the second terminal to establish a communication connection. The terminal further includes a broadcasting circuit configured to broadcast the connection message.

Also in accordance with the disclosure, there is provided a terminal for communication connection processing including a monitoring circuit configured to monitor one or more broadcasted messages each including a loading flag being invalid or valid, a determining circuit configured to determine one of the one or more messages in which the loading flag has changed from invalid to valid as a connection message, and an processing circuit configured to establish a communication connection with a device indicated by a connection identifier in the connection message.

Also in accordance with the disclosure, there is provided a system for communication connection processing including a first terminal including a loading region, at least one device carried by the first terminal, and a second terminal to be placed in the loading region. The first terminal is configured to generate a connection message in response to detecting the second terminal is placed in the loading region. The connection message includes at least one connection identifier each corresponding to one of the at least one device, and a loading flag that is configured as being valid for instructing the second terminal to establish a communication connection. The first terminal is further configured to broadcast the connection message. The second terminal is configured to monitor one or more broadcasted messages each including a loading flag being invalid or valid, determine one of the one or more messages in which the loading flag has changed from invalid to valid as the connection message, and establish the communication connection with the one of the at least one device.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

In accordance with some embodiments of the present disclosure, methods, devices, and systems for communication connection are provided for determining and establishing desired communication connections between terminal devices accurately and rapidly.

In some embodiments, a first terminal can carry a device with a wireless connection function. For example, the first terminal can be a portable gimbal platform for supporting a terminal device, such as a digital camera with a Bluetooth function or a WiFi function. In some embodiments, a second terminal can be a mobile terminal, such as a smart phone, a tablet computer, etc. The second terminal can establish a communication connection with the device carried by the first terminal via a WiFi connection or a Bluetooth connection. As such, the second terminal can receive data collected by the device carried by the first terminal, or transmit control instructions to the device carried by the first terminal.

Figure 1:
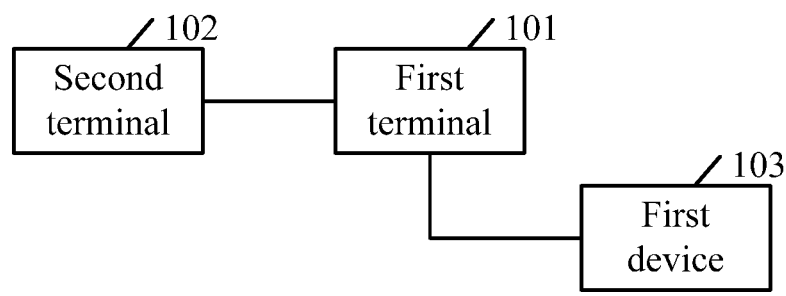
FIG. 1 is a schematic structural diagram of an exemplary system for processing communication connections in accordance with some embodiments of the present disclosure.

FIG. 1 is a schematic structural diagram of an exemplary system for processing communication connections in accordance with some embodiments of the present disclosure. As shown, the system includes a first terminal 101, a second terminal 102, and a first device 103 carried by the first terminal 101. In some embodiments, the first device 103 can be carried by the second terminal 102. The first terminal 101, the second terminal 102, and the first device 103 can be connected to each other by Bluetooth paring, or through any other suitable communication connection. For example, communication connections can be established between the second terminal 102 and the first terminal 101 or the first device 103 through a WiFi connection. The communication connection processing described in the present disclosure can include the processing for establishing the communication connections based on a Bluetooth identifier or a WiFi identifier.

The first terminal 101 can include a carrying region for carrying the first device 103, and a loading region for fixing the second terminal 102. The first device 103 can be carried by the first terminal 101 and can communicate with a main controller of the first terminal 101. A connection identifier of the first device 103 can be registered with the main controller. As such, the first terminal 101 can include the connection identifier of the first device 103 in a connection message for broadcasting.

The first terminal 101 can real-timely or periodically detect whether the second terminal 102 is placed in the loading region. In some embodiments, the first terminal 101 can include any suitable sensor within the loading region for sensing whether the second terminal 102 is placed in the loading region.

For example, a distance sensor for measuring distance, such as an ultrasonic wave sensor, an infrared sensor, etc., can be placed on one side of the loading region of the first terminal 101 that is used for contacting with the second terminal 102. When the second terminal 102 is placed on the loading region of the first terminal 101, an ultrasonic wave or an infrared ray emitted by an emitter of the distance sensor can be reflected by the second terminal 102 and then received by a receiver of the distance sensor. The distance from the second terminal 102 to the sensor can be measured based on a time duration from transmission to reception and a moving speed of the ultrasonic wave or the infrared ray. If the measured distance is "0" or less than a certain distance threshold (e.g., 5 mm), it can be determined that the second terminal 102 has been placed in the loading region.

As another example, a pressure sensor can be placed on one side of the loading region of the first terminal 101 in contact with the second terminal 102. When the second terminal 102 is placed on the loading region of the first terminal 101, a pressure can be generated on the surface of the loading region due to the weight of the second terminal 102. In response to detecting a pressure by the pressure sensor, it can be determined that the second terminal 102 has been placed in the loading region.

As yet another example, a light sensor can be used to determine whether the second terminal 102 is placed in the loading region. In response to detecting that the loading region becomes darker, it can be determined that the second terminal 102 has been placed in the loading region.

As yet another example, a camera can be placed on one side of the loading region of the first terminal 101 that is used for contacting with the second terminal 102. When the second terminal 102 is closer to the loading region of the first terminal 101, the image of the second terminal 102 captured by the camera can be larger. In response to capturing an image of the second terminal 102 larger than a certain area threshold by the camera, it can be determined that the second terminal 102 has been placed in the loading region.

As yet another example, a temperature sensor can be used to determine whether the second terminal 102 is placed in the loading region. Generally, an electronic device can generate during operation. For example, after a smart phone is turned on, corresponding heat can be generated by the smart phone. Thus, in response to detecting a temperature of the loading region higher than a certain temperature threshold by the temperature sensor, it can be determined that the second terminal 102 has been placed in the loading region. The certain temperature threshold can be set according to the ambient temperature, and may be slightly higher than the ambient temperature.

In order for the second terminal 102 to communicate with the first terminal 101 and/or the first device 103, the first terminal 101 can broadcast a connection message including the connection identifier of the first terminal 101 and/or the connection identifier of the first device 103. The connection identifier of the first terminal 101 or the first device 103 can be a WiFi identifier, a Bluetooth address, or an identification ID of the first terminal 101 or the first device 103. The connection identifier of the first device 103 can be allocated by the first terminal 101. A connection between the first terminal 101 and the second terminal 102 and/or a connection between the second terminal 102 and the first device 103 can be established based on the connection identifier of the first terminal 101 and/or the connection identifier of the first device 103.

The connection message can further include a loading flag. When the second terminal 102 is placed in the loading region of the first terminal 101, the loading flag can be valid and, for example, can be configured as "1" to indicate that the loading flag is valid. When the second terminal 102 is not placed in the loading region of the first terminal 101, the loading flag can be invalid and, for example, can be configured as "0" to indicate that the loading flag is invalid.

When the second terminal 102 receives multiple messages in broadcast, and one of the multiple messages includes a loading flag, it can determine whether the loading flag is changed compared with the corresponding loading flag of the one of the multiple messages received last time. If the loading flag is changed from invalid to valid, it can be determined that the second terminal 102 has established a connection with the terminal or device corresponding to the connection message of which the loading flag is changed from invalid to valid.

That is, the loading flag being valid can indicate that the second terminal 102 is currently placed on the first terminal 101 which broadcasts a connection message including a changed loading flag. When the second terminal 102 is placed on the first terminal 101, the second terminal 102 can perform data exchange with the first terminal 101 or the first device 103 carried by the first terminal 101. By setting the loading flag and detecting whether the loading flag is changed, the second terminal 102 can find the connection message broadcasted by the first terminal 101 quickly. As such, the second terminal 102 can establish a communication with the first terminal 101 and/or the first device 103 quickly.

In response to detecting one connection message including a loading flag that is changed from invalid to valid, the second terminal 102 can determine a connection identifier of the first device 103 based on the connection message, and can establish a communication connection with the first device 103 according to the connection identifier of the first device 103. In some embodiments, based on the connection identifier of the first device 103 in the connection message, the second terminal 102 can establish a communication connection with the first device 103 directly through a Bluetooth link or a WiFi link. As such, the second terminal 102 can directly control the first device 103, or can directly receive data collected by the first device 103.

After the communication connection between the second terminal 102 and the first device 103 is established, the second terminal 102 can directly receive data collected by the first device 103, or can directly send a control instruction to the first device 103 to control the first device 103.

In some embodiments, the second terminal 102 can establish a communication connection with the first terminal 101. The second terminal 102 can send the control instruction to the first terminal 101, and the first terminal 101 can forward the control instruction to the first device 103. Further, the first device 103 can transmit the collected data to the second terminal 102 through the first terminal 101.

In some embodiments, any suitable device carried by the first terminal 101 can send a control instruction to the second terminal 102 to control the second terminal 102. For example, the first device 103 can be a camera, and the second terminal 102 can be a smart phone. When the camera is going to take a photo, the camera can send an ambient lighting control instruction to the smart phone to turn on a lighting module to illuminate the environment. As such, the photograph captured by the camera can be clearer.

In some other embodiments, the first terminal 101 can carry two or more devices having a wireless connection function. For example, the first terminal 101 can be a portable gimbal platform for supporting any suitable devices having a Bluetooth function or a WiFi function, such as a camera, a lighting device, an infrared detector, a wind speed detector, an accelerometer, a GPS receiver, etc. The second terminal 102 can be a mobile terminal, such as a smart phone, a tablet computer, a smart watch, etc. The second terminal 102 can establish a communication connection with each device carried by the first terminal 101 by a WiFi connection, a Bluetooth connection or the like, so as to receive data collected by the each device, or send control instructions to the each device.

Figure 2:
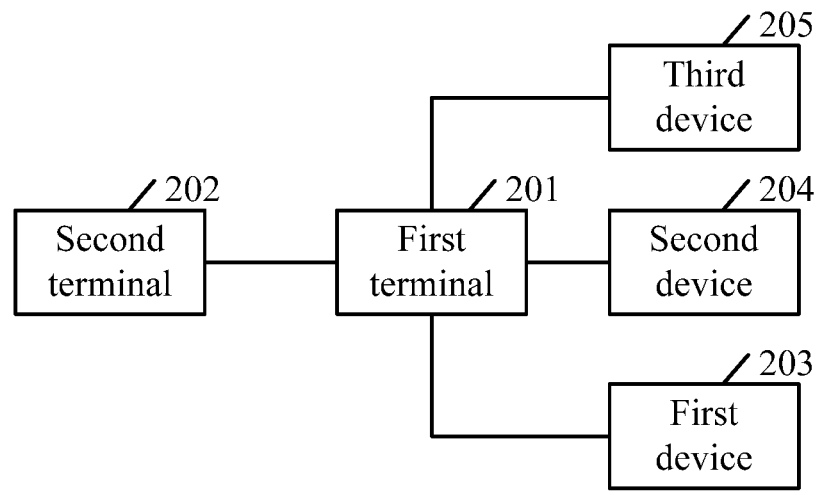
FIG. 2 is a schematic structural diagram of another exemplary system for processing communication connections in accordance with some other embodiments of the present disclosure.

FIG. 2 is a schematic structural diagram of another exemplary system for processing communication connections in accordance with some other embodiments of the present disclosure. As shown, the system includes a first terminal 201, a second terminal 202, a first device 203, a second device 204, and a third device 205.

The first device 203, the second device 204, and the third device 205 can be carried by the first terminal 201. The first device 203, the second device 204, and the third device 205 can establish communication connections with the first terminal 201 using wired connections or wireless connections. The first device 203, the second device 204, and the third device 205 can register their connection identifiers respectively with the first terminal 201. As such, the first terminal 201 can include the connection identifiers of the first device 203, the second device 204, and the third device 205 in a connection message for broadcasting.

In some embodiments, the first terminal 201 can include any suitable sensors, such as distance sensor, pressure sensor, light sensor, camera, temperature sensor, etc., to detect whether the second terminal 202 is placed in a loading region of the first terminal 201. Further, embodiments described above in connection with FIG. 1 can be referenced to for the configuration and function of the loading flag in the connection message for broadcasting by the first terminal 201.

In response to detecting that the second terminal 202 is placed in the loading region of the first terminal 201, the first terminal 201 can generate the connection message. The connection message can include a first connection identifier of the first device 203, a second connection identifier of the second device 204, a third connection identifier of the third device 205, and a loading flag configured as "1." The first terminal 201 can broadcast the connection message.

When the second terminal 202 receives the connection message, the second terminal 202 can determine whether the loading flag is changed from invalid to valid compared with the corresponding loading flag of the connection message received last time. In response to determining that the loading flag is changed from invalid to valid, the second terminal 202 can extract the multiple connection identifiers in the connection message. Based on the first connection identifier of the first device 203, the second connection identifier of the second device 204, and the third connection identifier of the third device 205, the second terminal 202 can directly establish communication connections with the first device 203, the second device 204, and/or the third device 205. The multiple connection identifiers can be WiFi identifiers, Bluetooth identifiers, etc.

After extracting the multiple connection identifiers, the second terminal 202 can select one or more connection identifiers among the multiple connection identifiers that are identical to one or more connection identifiers recorded in the second terminal 202 that indicate the corresponding one or more devices had been successfully connected to the second terminal 202 last time. The second terminal 202 can prioritize the communication connection with the one or more devices corresponding to the selected one or more connection identifiers.

For example, if the second terminal 202 was successfully connected to the second device 204 last time, the second terminal 202 can record the second connection identifier of the second device 204. If a new connection message received by the second terminal 202 includes the second connection identifier of the second device 204, the second device 204 can have a priority in establishing a communication connection with the second terminal 202 based on the second connection identifier of the second device 204.

In some embodiments, prioritizing a communication connection includes only establishing a communication connection with the device corresponding to the selected connection identifier. In some other embodiments, prioritizing a communication connection includes first establishing a communication connection with the device corresponding to the selected connection identifier, and then determining whether to establish communication connections with the devices corresponding to other connection identifiers in the connection message. For example, in response to receiving a new instruction to establish one or more communication connections, the terminal can follow the new instruction to establish the one or more communication connections.

In some embodiments, the connection message for broadcasting can further include one or more switch states corresponding to the one or more connection identifiers respectively. The switch state can indicate whether the device corresponding to the connection identifier associated with the switch state is on or off After extracting the multiple connection identifiers, the second terminal 202 can select one or more connection identifiers each associated with a switch state that is an on state. The second terminal 202 can establish communication connections with one or more devices corresponding to the selected one or more connection identifiers.

For example, a connection message can include "first connection identifier of the first device 203—off state," "second connection identifier of the second device 204—on state," and "third connection identifier of the third device 205—on state." In response to receiving the above connection message, the second terminal 202 can select the second connection identifier of the second device 204 and the third connection identifier of the third device 205, and establish communication connections with the second device 204 and the third device 205.

Further, based on the one or more connection identifiers each associated with a switch state that is an off state, the second terminal 202 can present a prompt message to indicate that the one or more devices corresponding to the one or more connection identifiers are not turned on. As such, a user can send a control instruction to the first terminal 201 through the second terminal 202. The first terminal 201 can turn on the one or more devices based on the control instruction.

After the second terminal 202 has established the communication connections with the first device 203, the second device 204, and the third device 205, the second terminal 202 can interact with the first device 203, the second device 204, and the third device 205.

The second terminal 202 can automatically display interactive interfaces for interacting with the first device 203, the second device 204, and the third device 205 in split screens. A user can input a control instruction to the first device 203, the second device 204, or the third device 205 through the interactive interfaces in the split screens. The returned data from the first device 203, the second device 204, or the third device 205 can also be displayed in the interactive interfaces in the split screens. It is noted that, if one device carried by the first terminal 201 is not configured with an interactive interface, then the interactive interfaces displayed in the split screens do not include an interactive interface for the one device.

In some embodiments, the second terminal 202 can directly send one or more control instructions or control messages to the first device 203, the second device 204, and the third device 205 through the established communication connections. A control message directly sent by the second terminal 202 can include one or more specific control instructions and one or more device identifiers. The second terminal 202 can broadcast the control message. The multiple devices can received the control message broadcasted by the second terminal.

A device receiving the control message can check whether the control message includes a device identifier matching the connection identifier of the device registered in the first terminal 201. In response to determining that the control message includes a device identifier matching the connection identifier of the device registered in the first terminal 201, the device can perform the one or more specific control instructions included in the control message. In response to determining that the control message does not include a device identifier matching the connection identifier of the device registered in the first terminal 201, the device can omit the control message.

In some other embodiments, the second terminal 202 can send a comprehensive control message to the first terminal 201. The comprehensive control message can include one or more specific control instructions and one or more controlled objects of the one or more specific control instructions. The one or more controlled objects can be represented by one or more device identifiers. For example, the comprehensive control message can include one or more fields, each of which records a pair of control instruction and device identifier. The device identifier can be an identifier registered in the first terminal 201 by the device carried by the first terminal 201. In some embodiments, the device identifier of a device can include the connection identifier of the device.

The devices carried by the first terminal 201 can send one or more control instructions to the second terminal 202 to control the second terminal 202. For example, the first device 203 can be a camera, and the second terminal 202 can be a smart phone. When the camera needs to take a photo, the camera can send an ambient lighting control instruction to the smart phone to turn on a lighting module to illuminate the environment. As such, the photograph captured by the camera can be clearer. As another example, the first device 203 can be a GPS receiver, and the second terminal 202 can be a smart phone. When the GPS receiver arrives at a target location, the GPS receiver can send a photographing control instruction to the smart phone to turn on a camera module to take a photo of the environment of the target location.

Figure 3:
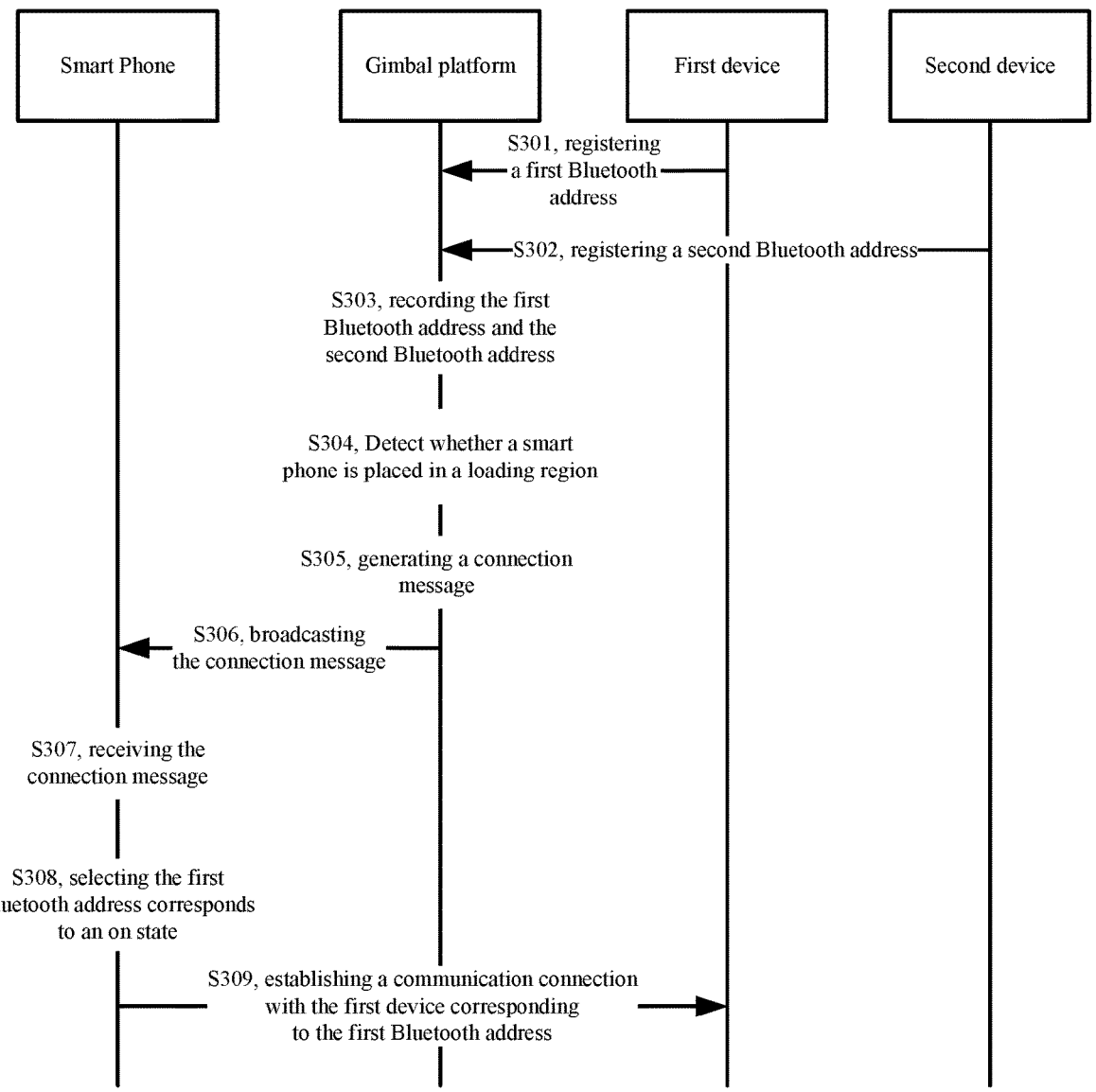
FIG. 3 is a schematic flow chart of an exemplary method for processing communication connections in accordance with some embodiments of the present disclosure.

FIG. 3 is a schematic flow chart of an exemplary method for processing communication connections in accordance with some embodiments of the present disclosure. In the example shown in FIG. 3, the process can be performed through interactions between a portable gimbal platform, a first device and a second device carried by the portable gimbal platform, and a smart terminal. The portable gimbal platform can carry one or more terminal devices or can carry only one terminal device.

As shown in FIG. 3, at S301, the first device registers a first connection identifier with the portable gimbal platform. The first connection identifier can be, for example, a first Bluetooth address of the first device.

At S302, the second device registers a second connection identifier with the portable gimbal platform. The second connection identifier can be, for example, a second Bluetooth address of the second device.

At S303, the portable gimbal platform records the first connection identifier of the first device and the second connection identifier of the second device. For example, the portable gimbal platform can record the first Bluetooth address and the second Bluetooth address.

At S304, it is detected whether the smart phone is placed in a loading region of the portable gimbal platform. In response to detecting the smart phone is not placed in the loading region of the portable gimbal platform, the process at S304 can be repeated to continuously detect whether the smart phone is placed in the loading region of the portable gimbal platform. The detection can be performed by using any suitable sensor, such as a distance sensor, a pressure sensor, etc.

In response to detecting that the smart phone is placed in the loading region of the portable gimbal platform, the portable gimbal platform generates a connection message at S305, and broadcasts the connection message at S306. The connection message can include connection identifiers, switch states, and loading flags corresponding to the first device and the second device by using any suitable format. An exemplary format of the connection message is shown in Table 1 below.

TABLE 1

| First Bluetooth address - On state | Second Bluetooth address - Off state | Loading flag (0 - invalid; 1 - valid) |
|---|---|---|

At S307, the smart phone receives the connection message. The smart phone can receive the connection message broadcasted by the portable gimbal platform, and can also receive other messages, such as a message broadcasted by the first device. Before and after being placed in the loading region of the portable gimbal platform, the smart phone may receive multiple messages broadcasted by the portable gimbal platform. At S307, when identifying one connection message that contains a changed loading flag, the smart phone can parse the connection identifiers and switch states from the connection message. For example, based on the timing of placing the smart phone in the loading region of the portable gimbal platform, the smart phone can compare the messages broadcasted by a same terminal before and after the timing. As such, the connection message containing a loading flag changed from invalid to valid can be identified.

At S308, the smart phone can select one or more connection identifiers based on the switch states. For example, as shown in FIG. 3, the smart phone can select the first connection identifier and may not select the second connection identifier based on the switch states respectively. Since the first Bluetooth address corresponds to an on state and the second Bluetooth address corresponds to an off state, the smart phone can select the first Bluetooth address and may not select the second Bluetooth address.

The off state of the second device can indicate that the corresponding function of the second device are turned off. For example, a lighting device carried by the portable gimbal platform can be in a standby state, and can be turned on to illuminate at any time. In the standby state of the lighting device, the lighting function can be turned off, but other functions, such as a Bluetooth module, can be turned on.

At S309, the smart phone directly establishes a communication connection with the one or more devices corresponding to the selected one or more connection identifiers. For example, as shown in FIG. 3, the smart phone directly establishes a communication connection with the first device based on the selected first Bluetooth address.

In the disclosed method for processing communication connections, the smart phone can establish a communication connection with a device through a connection message containing a loading flag in the connection message, rather than directly establishing a communication connection with the device corresponding to the connection identifier in the connection message. As such, the disclosed method can ensure that the smart phone can be connected with a desired device. In some implementations, when a smart phone is placed on a portable gimbal platform, the smart phone can be connected with one or more devices carried by the portable gimbal platform to receive data from the one or more devices or to control the one or more devices. By using the loading flag in the connection message, it can be ensured that the smart phone can be connected to the one or more devices carried by the portable platform while the messages from other devices not being carried by the portable platform can be excluded. Therefore, the smart phone can quickly establish communication connections with the one or more devices carried by the portable platform to meet the automation and smart requirements for establishing communication connections.

Figure 4:
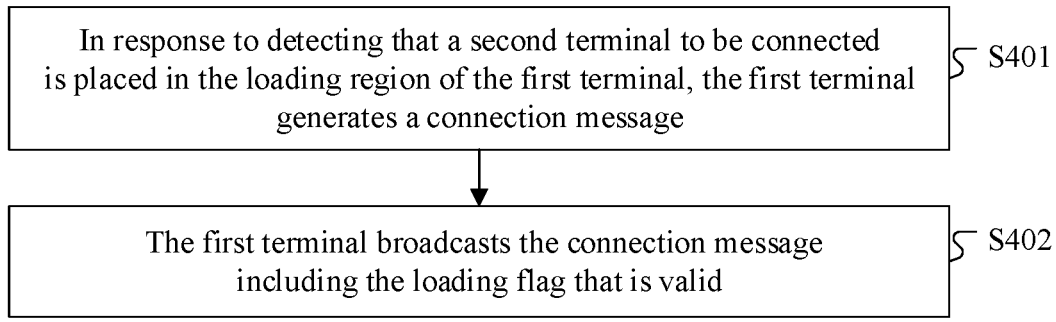
FIG. 4 is a schematic flow chart of another exemplary method for processing communication connections in accordance with some other embodiments of the present disclosure.

FIG. 4 is a schematic flow chart of another exemplary method for processing communication connections in accordance with some other embodiments of the present disclosure. The method can be performed by a first terminal described above, such as a portable gimbal platform. The portable gimbal platform can have a smart control function. A control device in the portable gimbal platform can control the portable gimbal platform to rotate, and can control one or more devices carried by the portable gimbal platform.

For example, the portable gimbal platform can be a three-axis portable gimbal platform. The control device of the three-axis portable gimbal platform can control a camera carried by the three-axis portable gimbal platform to rotate in three dimensions, such as a pitch direction, a roll direction, and a yaw direction. Further, the control device of the three-axis portable gimbal platform can control the camera to photograph, or to control a lighting device carried by the three-axis portable gimbal platform to increase brightness for illumination, etc.

In some embodiments, the one or more devices carried by the portable gimbal platform have a wireless connection function, such as a Bluetooth function, a WiFi function, etc. The control device of the portable gimbal platform can broadcast the connection identifiers of the one or more devices, such as Bluetooth addresses, WiFi identifiers, etc. As such, the second terminal, such as a smart phone, a tablet computer, etc., can be connected to the one or more devices.

As shown in FIG. 4, the method includes the following processes.

At S401, in response to detecting that the second terminal to be connected is placed in the loading region of the first terminal, the first terminal generates a connection message. The connection message can include a loading flag configured as being valid and at least one connection identifier of at least one device carried by the first terminal. The loading flag can be used to indicate to the second terminal to prioritize communication connection based on the connection message having the loading flag configured as being valid.

A format of the connection message can be determined by a negotiation between the first terminal and the second terminal. The control device in the first terminal can enclose the connection identifiers of the one or more devices carried by the first terminal and one or more corresponding loading flags in the determined format. An application installed in the second terminal can parse the received connection message based on the determined format to obtain each connection identifier and the loading flag.

In some embodiments, generating the connection message can include modifying the loading flag in the message that has been generated and broadcasted. Before the second terminal is placed in the loading region, the loading flag in the message generated by the first terminal is invalid. That is, a value of the loading flag is "0." After the second terminal is placed in the loading region, the loading flag in the message can be modified to be valid. That is, a value of the modified loading flag is "1." As such, a new connection message including the loading flag that is valid can be generated.

In some other embodiments, in response to detecting that the second terminal is placed in the loading region, the first terminal can collect one or more connection identifiers of the one or more device carried by the first terminal. Based on the one or more connection identifiers, the first terminal can generate a connection message including a loading flag that is valid.

At S402, the first terminal broadcasts the connection message including the loading flag that is valid. As such, the second terminal can establish one or more communication connections with the one or more devices carried by the first terminal based on the connection message.

In some embodiments, before the process at S401, the first terminal can call a preset loading detection module to detect whether the second terminal to be connected is placed in the loading region of the first terminal. The preset loading detection module can include any suitable sensor within the loading region for sensing whether the second terminal is placed in the loading region.

For example, the loading detection module can include a distance measuring module arranged in the loading region. If the distance obtained by the distance measuring module is smaller than a preset distance threshold, it can be determined that the second terminal is placed in the loading region.

As another example, the loading detection module can include a pressure measuring module arranged in the loading region. If the pressure detected by the pressure measuring module is higher than a preset pressure threshold, it can be determined that the second terminal is placed in the loading region.

As yet another example, the loading detection module can include a photographing module arranged in the loading region. If the photographing module detects an object on a surface of the loading region that has an area larger than an area threshold, it can be determined that the second terminal is placed in the loading region.

As yet another example, the loading detection module can include a temperature measuring module arranged in the loading region. If the temperature of the loading region detected by the temperature measuring module is higher than a preset temperature threshold, it can be determined that the second terminal is placed in the loading region.

After the second terminal has established the communication connections with the one or more devices carried by the first terminal, the second terminal can interact with the one or more devices through the communication connections, and can send one or more control messages through the first terminal to control the one or more devices.

In some embodiments, the first terminal can received the control message sent from the second terminal. The control message can include one or more control instructions, and one or more device identifiers associated with the one or more control instructions. Based on the one or more device identifiers in the control message, the first terminal can send the one or more control instructions to the one or more devices indicated by the one or more device identifiers, respectively. As such, the one or more devices indicated by the one or more device identifiers can response to the one or more control instructions and be controlled to operate based on the one or more control instructions.

In some embodiments, a format of the control message can be determined based on a negotiation between the first terminal and the second terminal. An application installed in the second terminal can enclose the one or more control instructions and one or more device identifiers associated with the one or more control instructions based on the negotiated format to obtain the control message. An exemplary format of the control message is shown in Table 2 below.

TABLE 2

| Photographing instruction - First Bluetooth address | Lighting module opening instruction - Second Bluetooth address |
|---|---|

In some embodiments, the device identifiers can be represented by directly using the connection identifiers of the one or more devices. In some embodiments, any other suitable identifications of devices can be used as the device identifiers. Each identification of device can correspond to a unique device, and can be registered with the first terminal when the unique device is mounted to the first terminal. The second terminal can obtain the one or more device identifiers by interacting with the first terminal.

In some embodiments, the connection message can further include one or more switch states of the one or more devices carried by the first terminal. Based on the switch states, the terminal receiving the connection message can select to establish a communication connection with a device of which the corresponding switch state is an on state.

The present disclosure also provides a non-transitory computer-readable storage medium storing computer-executable instructions that, when executed by a hardware processor, cause the hardware processor to perform the processes of the method described above in connection with FIG. 4.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met.

Figure 5:
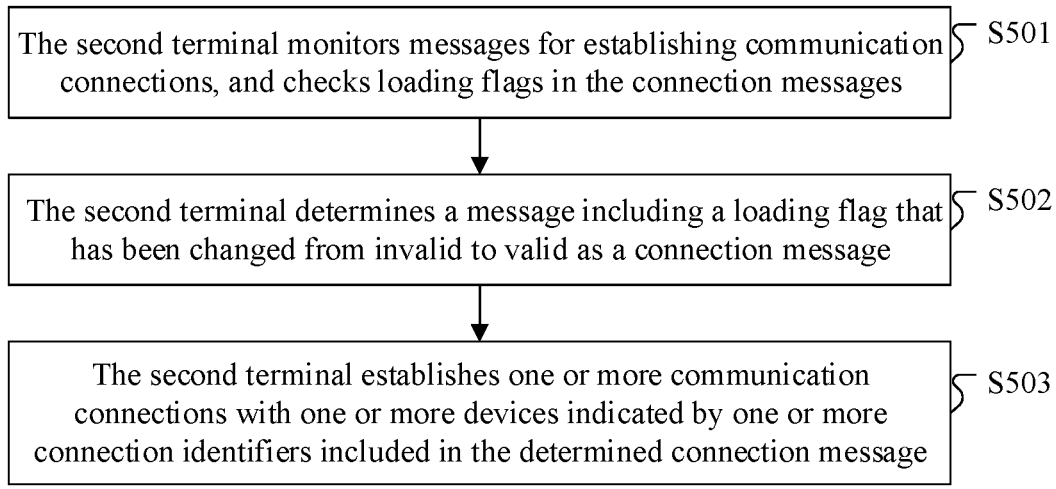
FIG. 5 is a schematic flow chart of another exemplary method for processing communication connections in accordance with some other embodiments of the present disclosure.

FIG. 5 is a schematic flow chart of another exemplary method for processing communication connections in accordance with some other embodiments of the present disclosure. The method can be performed by a second terminal that has a wireless connection module, such as a Bluetooth module, a WiFi module, etc. The second terminal can be a smart phone, a tablet computer, etc. As shown, the method includes the following processes that can be performed by an application installed in the second terminal.

As shown in FIG. 5, at S501, the second terminal monitors messages for establishing communication connections, and checks loading flags in the connection messages. Descriptions above of the generation and the broadcasting of the connection message by the first terminal can be referenced to for the content, the generation, and the broadcasting of the connection messages.

The messages broadcasted by a same terminal before and after the second terminal being placed in the loading region of a first terminal can be compared to determine whether the loading flag is changed from invalid to valid. In some embodiments, the first terminal can broadcast a message including a loading flag that is invalid when the loading region of the first terminal does not have a second terminal. The first terminal can broadcast a message including a loading flag that is valid when the loading region of the first terminal has a second terminal. As such, the change of the loading flag can be determined.

At S502, the second terminal determines a message including a loading flag that has been changed from invalid to valid as a connection message. In some embodiments, the message including a loading flag that has been changed from invalid to valid can be determined as the connection message for subsequent processing. Other messages can be omitted.

At S503, the second terminal establishes one or more communication connections with one or more devices indicated by one or more connection identifiers included in the determined connection message.

In some embodiments, based on the one or more connection identifiers included in the connection message, the second terminal can directly establish communication connections with the one or more devices corresponding to the one or more connection identifiers. For example, the second terminal can generate one or more connection requests based on the connection message, and send the one or more connection requests to one or more devices corresponding to the one or more connection identifiers in the connection message to establish one or more communication connections with the one or more devices, respectively.

In some other embodiments, the second terminal can indirectly connect with the one or more devices corresponding to the one or more connection identifiers through the first terminal. For example, the second terminal can generate a connection request based on the connection message, and send the connection request to the first terminal that broadcasted the connection message to establish one or more communication connections with the one or more devices corresponding to the one or more connection identifiers in the connection message.

Further, the second terminal can select one or more connection identifiers from the connection message based on priorities to establish one or more communication connections with the one or more devices corresponding to the selected one or more connection identifiers. For example, one or more devices corresponding to the one or more connection identifiers associated with an on switch state can have priorities in establishing communication connections with the second terminal. As another example, one or more devices that had been connected with the second terminal before can have priorities in establishing communication connections with the second terminal.

In some embodiments, based on the switch state included in the connection message, the second terminal can preferentially establish one or more communication connections with the one or more devices corresponding to the one or more connection identifiers associated with an on switch state. The switch state can indicate whether a device carried by the first terminal is on or off.

In some embodiments, after establishing the one or more communication connections with the one or more devices indicated by the one or more connection identifiers in the connection message, the second terminal can record the connection identifiers of the one or more devices that have successfully connected with the second terminal. In response to determining that one or more connection identifiers included in a received connection message have been already recorded by the second terminal, the second terminal can preferentially establish one or more communication connections with the one or more devices indicated by the one or more connection identifiers recorded by the second terminal.

In some embodiments, the second terminal can simultaneously send connection requests to multiple devices corresponding to multiple connection identifiers in the connection message. In some embodiments, the second terminal can select one or more connection identifiers from the connection identifiers included the determined connection message. The second terminal can then send a connection request including the selected one or more connection identifiers to the first terminal. The connection request can be used to request the first terminal to send one or more requests to one or more devices corresponding to the one or more connection identifiers included in the connection request. The first terminal can send the one or more requests to the one or more devices indicated by the selected one or more connection identifiers. As such, the one or more devices corresponding to the selected one or more connection identifiers can establish one or more communication connections with the second terminal, respectively.

Further, after the communication connections with the multiple devices are established, the second terminal can display two or more interactive interfaces configured for two or more devices of the connected devices in split screens. The second terminal can display an interactive interface of a connected device in one of the split screens. Data received from a connected device can be displayed in the interactive interface corresponding to the connected device.

In some embodiments, a user control operation to a connected device can be received in the corresponding interactive interface. In response to receiving the control operation, the second terminal can directly send one or more control instructions corresponding to the control operation to the connected device, or can send a control message to the first terminal. The control message can include one or more control instructions and the device identifier of the connected device associated with the one or more control instructions. The control message can instruct the first terminal to send the one or more control instructions corresponding to the control operation to the connected device indicated by the device identifier in the control message.

The present disclosure also provides a non-transitory computer-readable storage medium containing computer-executable instructions that, when executed by a hardware processor, cause the hardware processor to perform the processes of the method described above in connection with FIG. 5.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met In the following, device for processing communication connections, and portable gimbal platform, smart terminal, etc., are described in detail.

Figure 6:
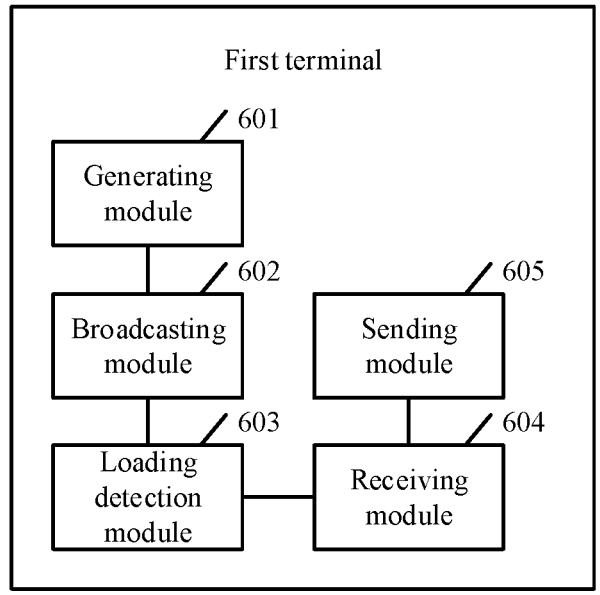
FIG. 6 is a schematic structural diagram of an exemplary device for processing communication connections in accordance with some embodiments of the present disclosure.

FIG. 6 is a schematic structural diagram of an exemplary device for processing communication connections in accordance with some embodiments of the present disclosure. The device can be configured in a first terminal described above, such as a smart portable gimbal platform. As shown, the device includes a generating module 601, i.e., a generating circuit, and a broadcasting module 602, i.e., a broadcasting circuit.

The generating module 601 can be configured to generate a connection message in response to detecting that a second terminal to be connected is placed in the loading region of the first terminal. The connection message can include a loading flag configured as being valid and at least one connection identifier of at least one device carried by the first terminal. The loading flag configured as being valid can be used to indicate that the second terminal can prioritize at least one communication connection based on the connection message having the loading flag configured as being valid.

The broadcasting module 602 can be configured to broadcast the connection message including the loading flag that is valid. As such, the second terminal can establish one or more communication connections with the one or more devices carried by the first terminal based on the connection message.

In some embodiments, as shown in FIG. 6, the device further includes a loading detection module 603, i.e., a loading detection circuit, configured to detect whether the second terminal to be connected is placed in the loading region of the first terminal. In some embodiments, the loading detection module 603 can include any suitable detecting modules arranged in the loading region, such as a distance measuring module, a pressure measuring module, a photographing module, a temperature measuring module, etc., or any combinations thereof.

In some embodiments, as shown in FIG. 6, the device further includes a receiving module 604, i.e., a receiving circuit, and a sending module 605, i.e., a sending circuit. The receiving module 604 can be configured to receive a control message sent from the second terminal. The control message can include one or more control instructions, and one or more device identifiers associated with the one or more control instructions. The sending module 605 can be configured to send the one or more control instructions to the one or more devices indicated by the one or more device identifiers in the control message, respectively. As such, the one or more devices indicated by the one or more device identifiers can response to the one or more control instructions and be controlled to operate based on the one or more control instructions.

In some embodiments, the connection message can further include one or more switch states corresponding to the one or more connection identifiers, respectively. The switch state can indicate whether the device corresponding to the connection identifier associated with the switch state is on or off. The one or more switch states can be used to facilitate the second terminal to select one or more connection identifiers associated with a switch state that is an on state, and to establish communication connections with the corresponding one or more devices of the selected one or more connection identifiers.

The one or more devices carried by the first terminal can include at least one of a photographing device, an infrared detection device, a wind speed measuring device, an acceleration measuring device, or a positioning device, etc. The first terminal can be a portable gimbal platform.

Functions and processes performed by the first describe described above can be referenced to for specific implementations of the various modules of the disclosed device.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met.

Figure 7:
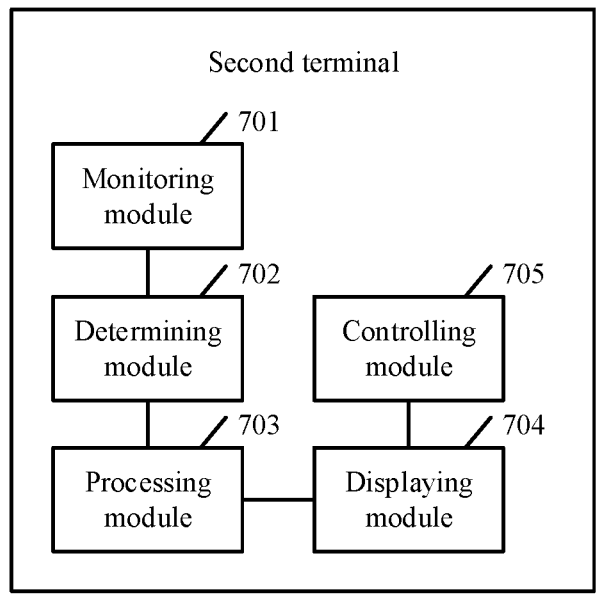
FIG. 7 is a schematic structural diagram of another exemplary device for processing communication connections in accordance with some other embodiments of the present disclosure.

FIG. 7 is a schematic structural diagram of another exemplary device for processing communication connections in accordance with some other embodiments of the present disclosure. The device can be configured in a second terminal described above that has a wireless connection module, such as a Bluetooth module, a WiFi module, etc. The second terminal can be a smart phone, a tablet computer, etc. As shown in FIG. 7, the device includes a monitoring module 701, i.e., a monitoring circuit, a determining module 702, i.e., a determining circuit, and a processing module 703, i.e., a processing circuit.

The monitoring module 701 can be configured to monitor messages for establishing communication connections, and checking a loading flag in each message. The determining module 702 can be configured to, based on comparison results, determine one of the messages that includes a loading flag that has been changed from invalid to valid as a connection message. The processing module 703 can be configured to establish one or more communication connections with one or more devices indicated by one or more connection identifiers included in the determined connection message.

In some embodiments, the processing module 703 can be further configured for establishing one or more communication connections with the one or more devices based on priorities.

For example, the processing module 703 can, based on switch states included in the connection message, preferentially establish one or more communication connections with one or more devices having a switch state that is an on state. The switch state can indicate that a device carried by the first terminal is on or off.

As another example, after establishing one or more communication connections with the one or more devices indicated by the one or more connection identifiers in the connection message, the processing module 703 can record the connection identifiers of the one or more devices that the second terminal has successfully connected with. In response to determining that one or more connection identifiers included in a received connection message have been already recorded by the second terminal, the processing module 703 can preferentially establish one or more communication connections with the one or more devices indicated by the recorded one or more connection identifiers.

In some embodiments, the processing module 703 can simultaneously send connection requests to multiple devices corresponding to multiple connection identifiers in the connection message. In some other embodiments, the processing module 703 can select one or more connection identifiers from multiple connection identifiers included in the determined connection message. The processing module 703 can then send a connection request including the selected one or more connection identifiers to the first terminal. The connection request is used to request the first terminal to send requests to one or more devices corresponding to the one or more connection identifiers included in the connection request, to establish one or more communication connections between the second terminal and the one or more devices.

In some embodiments, as shown in FIG. 7, the device further includes a displaying module 704, i.e., a displaying circuit. The displaying module 704 can be configured to, after the communication connections with the one or more devices are established, display a user interface for each connected device, or display two or more interactive interfaces of the two or more connected devices in split screens, respectively.

In some embodiments, as shown in FIG. 7, the device further includes a controlling module 705, i.e., a controlling circuit, configured to send a control message to the first terminal. The control message can include one or more control instructions and one or more device identifiers associated with the one or more control instructions. The control message can instruct the first terminal to send the one or more control instructions to one or more devices indicated by the one or more device identifiers in the control message. The first terminal can be a mobile terminal that is able to receive connection messages and send control messages based on WiFi connections or Bluetooth connections.

Functions and processes performed by the second terminal described above can be referenced to for the specific implementations of the various modules of the disclosed device.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met.

Figure 8:
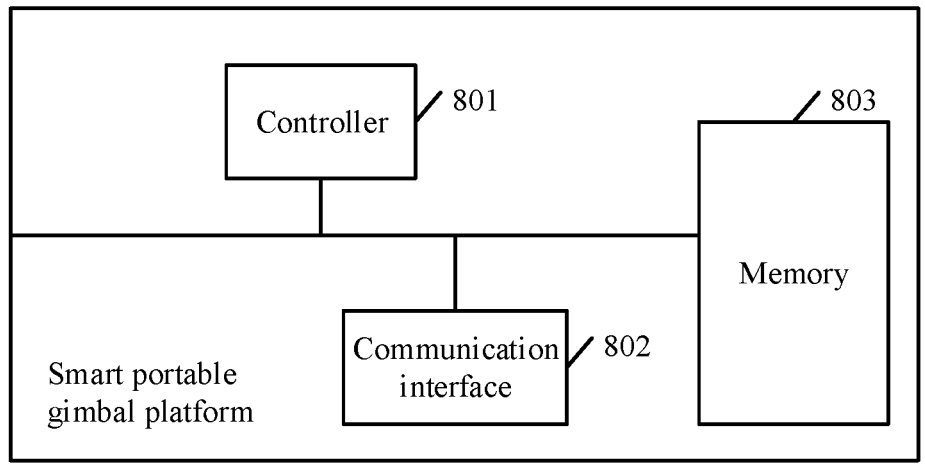
FIG. 8 is a schematic structural diagram of an exemplary smart portable gimbal platform in accordance with some embodiments of the present disclosure.

FIG. 8 is a schematic structural diagram of an exemplary smart portable gimbal platform in accordance with some embodiments of the present disclosure. The smart portable gimbal platform can be a single-axis portable gimbal platform or a three-axis portable gimbal platform.

As shown in FIG. 8, the smart portable gimbal platform includes a controller 801, a communication interface 802, and a memory 803. The smart portable gimbal platform can further include one or more carrier arms for carrying various devices, a power supply, a handle, and any other suitable components that are not shown in FIG. 8.

The communication interface 802 can be a Bluetooth connection interface, a WiFi connection interface, or any other suitable mobile communication network interface for implementing data exchange between the smart portable gimbal platform and one or more smart terminals.

The memory 803 can include a volatile memory, such as a random access memory (RAM). The memory 803 can include a non-volatile memory, such as a flash memory, a hard disk drive (HDD), a solid-state drive (SSD), etc. The memory 803 can include any suitable combination of the above-described types of memory.

The controller 801 can include a central processing unit (CPU). The controller 801 can further include a hardware chip, such as an application-specific integrated circuit (ASIC), a programmable logic device (PLD), or a combination thereof. The PLD can include a complex programmable logic device (CPLD), a field-programmable gate array (FPGA), etc.

In some embodiments, the memory 803 can be configured to store program instructions. The controller 801 can invoke the program instructions to generate a connection message in response to detecting that a second terminal to be connected is placed in the loading region of the smart portable gimbal platform. The connection message can include a loading flag configured as being valid and at least one connection identifier of at least one device carried by the smart portable gimbal platform. The loading flag configured as being valid can be used to indicate that the second terminal can preferentially establish at least one communication connection based on the connection message having the loading flag configured as being valid. The controller 801 can invoke the program instructions to broadcast the connection message including the loading flag that is valid.

In some embodiments, the controller 801 can be further configured to invoke a preset loading detection module to detect whether the second terminal to be connected is placed in the loading region of the smart portable gimbal platform.

The preset loading detection module can include any suitable sensor within the loading region for sensing whether the second terminal is placed in the loading region.

For example, the loading detection module can include a distance measuring module arranged in the loading region. If the distance obtained by the distance measuring module is smaller than a preset distance threshold, it can be determined that the second terminal is placed in the loading region.

As another example, the loading detection module can include a pressure measuring module arranged in the loading region. If the pressure detected by the pressure measuring module is higher than a preset pressure threshold, it can be determined that the second terminal is placed in the loading region.

As yet another example, the loading detection module can include a photographing module arranged in the loading region. If the photographing module detects an object on a surface of the loading region that has an area larger than an area threshold, it can be determined that the second terminal is placed in the loading region.

As yet another example, the loading detection module can include a temperature measuring module arranged in the loading region. If the temperature of the loading region detected by the temperature measuring module is higher than a preset temperature threshold, it can be determined that the second terminal is placed in the loading region.

In some embodiments, the controller 801 can be further configured to receive a control message sent from the second terminal. The control message can include one or more control instructions, and one or more device identifiers associated with the one or more control instructions. The controller 801 can be further configured to send the one or more control instructions to the one or more devices indicated by the one or more device identifiers in the control message, respectively. As such, the one or more devices indicated by the one or more device identifiers can response to the one or more control instructions and be controlled to operate based on the one or more control instructions.

In some embodiments, the connection message can further include one or more switch states of the one or more devices carried by the smart portable gimbal platform. Based on the switch states, the terminal receiving the connection message can select to establish a communication connection with a device of which the corresponding switch state is an on state.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met.

Figure 9:
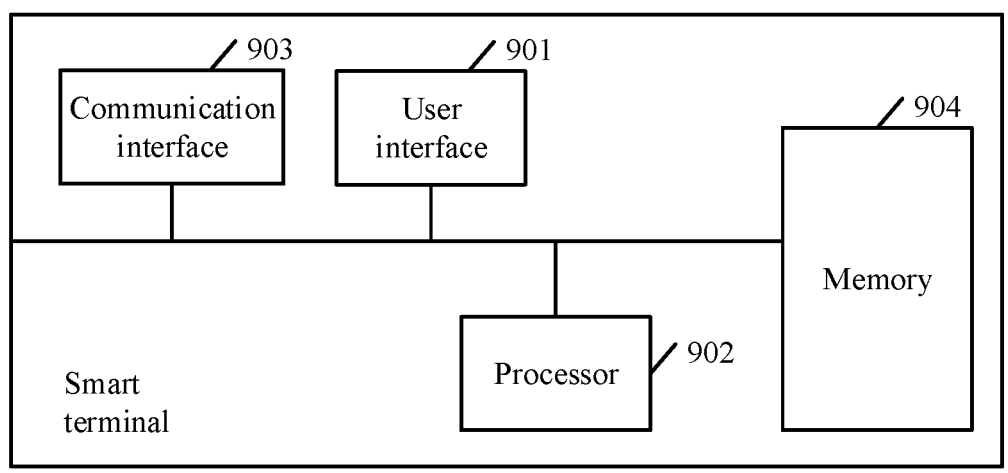
FIG. 9 is a schematic structural diagram of an exemplary smart terminal in accordance with some embodiments of the present disclosure.

FIG. 9 is a schematic structural diagram of an exemplary smart terminal in accordance with some embodiments of the present disclosure. The smart terminal can be a smart phone, a tablet computer, etc. As shown in FIG. 9, the smart terminal includes a user interface 901, a processor 902, a communication interface 903, and a memory 904. The smart terminal can further include a power supply, one or more buttons, a shell, and any other suitable components that are not shown in FIG. 9.

The user interface 901 can include a touch screen or any other suitable interface for enabling an interaction between the smart terminal and the user. For example, the user interface 901 can display application interfaces corresponding to the processing of the communication connections with multiple devices, and can receive user operations.

The communication interface 903 can be a Bluetooth connection interface, a WiFi connection interface, or any other suitable mobile communication network interface for implementing data exchange between the smart terminal and one or more devices carried by a portable gimbal platform.

The memory 904 can include a volatile memory, such as a random access memory (RAM). The memory 904 can include a non-volatile memory, such as a flash memory, a hard disk drive (HDD), a solid-state drive (SSD), etc. The memory 904 can include any suitable combination of the above-described types of memory.

The processor 902 can include a central processing unit (CPU). The processor 902 can further include a hardware chip, such as an application-specific integrated circuit (ASIC), a programmable logic device (PLD), or a combination thereof. The PLD can include a complex programmable logic device (CPLD), a field-programmable gate array (FPGA), etc.

In some embodiments, the memory 904 can be configured to store program instructions. The processor 902 can invoke the program instructions to monitor messages for establishing communication connections, check a loading flag in each message, determine a message including a loading flag that has been changed from invalid to valid as a connection message, and establish one or more communication connections with one or more devices indicated by one or more connection identifiers included in the determined connection message.

In some embodiments, the processor 902 can be further configured to generate one or more connection requests based on the connection message, send the one or more connection requests to the first terminal that broadcasted the connection message or to the one or more devices indicated by the one more connection identifiers in the connection message, to establish one or more communications connections with the one or more devices indicated by the one more connection identifiers.

Further, based on the switch states included in the determined connection message, the processor 902 can preferentially establish one or more communication connections with one or more devices corresponding to one or more connection identifiers associated with switch states that are on state. The switch state can indicate a device carried by the first terminal is on or off.

In some embodiments, after establishing one or more communication connections with the one or more devices indicated by the one or more connection identifiers in the connection message, the processor 902 can record the connection identifiers of the one or more devices that have successfully connected with the smart terminal into the memory 904. In response to determining that one or more connection identifiers included in a received connection message have already been recorded by the smart terminal, the processor 902 can preferentially establish one or more communication connections with the one or more devices indicated by the one or more connection identifiers recorded by the memory 904.

In some embodiments, the processor 902 can the second terminal can simultaneously send connection requests to multiple devices corresponding to multiple connection identifiers in the connection message. In some embodiments, the processor 902 can select one or more connection identifiers from the connection identifiers included the determined connection message. The processor 902 can then send a connection request including the selected one or more connection identifiers to the first terminal. The connection request can be used to request the first terminal to send one or more requests to one or more devices corresponding to the one or more connection identifiers included in the connection request. The first terminal can send the one or more requests to the one or more devices indicated by the selected one or more connection identifiers. As such, the one or more devices corresponding to the selected one or more connection identifiers can establish one or more communication connections with the second terminal, respectively.

In some embodiments, after the communication connections with one or more devices are established, the processor 902 can control the user interface 901 to display an interactive interface of each connected device, or display two or more interactive interfaces of the connected devices in split screens.

In some embodiments, the processor 902 can send a control message to the first terminal. The control message can include one or more control instructions and one or more device identifiers associated with the one or more control instructions. The control message can instruct the second terminal to send the one or more control instructions to one or more devices indicated by the one or more device identifiers in the control message.

According to the present disclosure, the connection message for broadcasting can include a loading flag. Based on the loading flag and the broadcasted connection message, the second terminal can quickly find the first terminal that carries the second terminal, and can directly establish communication connections with the one or more devices carried by the first terminal. As such, the automation and smart requirements for establishing communication connections can be met.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and modules may be omitted and references can be made to the descriptions of the exemplary methods.

The disclosed systems, devices, and methods may be implemented in other manners not described here. For example, the devices described above are merely illustrative. For example, the division of components and/or modules may only be a logical function division, and there may be other ways of dividing the components and/or modules. For example, multiple components and/or modules may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The modules described as separate components may or may not be physically separate, and a component shown as a unit may or may not be a physical unit. That is, the modules may be located in one place or may be distributed over a plurality of network elements. Some or all of the components may be selected according to the actual needs to achieve the object of the present disclosure.

In addition, the functional modules in the various embodiments of the present disclosure may be integrated in one processing module, or each module may be an individual physically module, or two or more modules may be integrated in one module.

A method consistent with the disclosure can be implemented in the form of computer program stored in a non-transitory computer-readable storage medium, which can be sold or used as a standalone product. The computer program can include instructions that enable a computer device, such as a personal computer, a server, a network device, a smart phone, or any other suitable smart electronic device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, an optical disk, etc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for communication connection processing, comprising:
   generating, by a portable gimbal platform in response to detecting that a terminal is placed in a loading region of the portable gimbal platform configured to attach the terminal to the portable gimbal platform, a connection message, detecting that the terminal is placed in the loading region of the portable gimbal platform including determining that an image of the terminal captured by a camera of the portable gimbal platform is larger than an area threshold, the connection message including:
      at least one connection identifier each corresponding to one of at least one device with a wireless connection function and carried by the portable gimbal platform; and
      a loading flag that is configured as being valid for instructing the terminal to establish a communication connection; and
   broadcasting the connection message.

2. The method of claim 1, wherein detecting that the terminal is placed in the loading region further includes at least one of:
   determining the terminal is placed in the loading region in response to determining that a distance measured by a distance sensor of the portable gimbal is shorter than a distance threshold; or
   determining the terminal is placed in the loading region in response to determining that a pressure detected by a pressure sensor of the portable gimbal is larger than a pressure threshold.

3. The method of claim 1, further comprising:
   receiving a control message from the terminal, the control message including a control instruction and a connection identifier associated with the control instruction; and
   sending the control instruction to a device indicated by the connection identifier.

4. The method of claim 1, wherein the connection message further includes:
   at least one switch state indicating whether the at least one device with the wireless connection function and carried by the portable gimbal platform is on or off.

5. The method of claim 1, wherein detecting that the terminal is placed in the loading region further includes determining the terminal is placed in the loading region in response to determining that a temperature detected by a temperature sensor of the portable gimbal platform is higher than a temperature threshold.

6. A method for communication connection processing, comprising:
- monitoring, by a terminal, one or more broadcasted messages generated and broadcasted by a portable gimbal platform, each of the one or more messages including a loading flag being invalid or valid;
- determining one of the one or more messages in which the loading flag has changed from invalid to valid as a connection message indicating the terminal is placed in a loading region of the portable gimbal platform configured to attach the terminal to the portable gimbal platform, wherein the terminal being placed in the loading region of the portable gimbal platform is detected by determining that an image of the terminal captured by a camera of the portable gimbal platform is larger than an area threshold; and
- establishing, by the terminal, a communication connection with a device with a wireless connection function, carried by the portable gimbal platform, and indicated by a connection identifier in the connection message.

7. The method of claim 6, wherein establishing, by the terminal, the communication connection with the device with the wireless connection function, carried by the portable gimbal platform, and indicated by the connection identifier includes:
- establishing, by the terminal, a communication connection with one device with the wireless connection function, carried by the portable gimbal platform, and corresponding to a connection identifier associated with a switch state indicating that the one device is on.

8. The method of claim 6, further comprising:
- after establishing, by the terminal, the communication connection with the device with the wireless connection function, carried by the portable gimbal platform, and indicated by the connection identifier, recording, by the terminal, the connection identifier.

9. The method of claim 6, wherein establishing, by the terminal, the communication connection with the device with the wireless connection function, carried by the portable gimbal platform, and indicated by the connection identifier includes:
- establishing, by the terminal, a communication connection with a device with the wireless connection function, carried by the portable gimbal platform, and indicated by a connection identifier that was previously recorded.

10. A portable gimbal platform for communication connection processing, comprising:
- a loading detection circuit configured to determine whether a terminal is placed in a loading region of the portable gimbal platform configured to attach the terminal to the portable gimbal platform, the loading detection circuit including a camera in the loading region, the loading detection circuit determining that the terminal is placed in the loading region in response to detecting that an image of the terminal captured by the camera is larger than an area threshold;
- a generating circuit configured to, in response to detecting the terminal is placed in the loading region of the portable gimbal platform, generate a connection message including:
  - at least one connection identifier each corresponding to one of at least one device with a wireless connection function and carried by the portable gimbal platform; and
  - a loading flag that is configured as being valid for instructing the terminal to establish a communication connection; and
- a broadcasting circuit configured to broadcast the connection message.

11. The portable gimbal platform of claim 10, the loading detection circuit further includes at least one of:
- a distance sensor in the loading region, the loading detection circuit determining that the terminal is placed in the loading region if a distance measured by the distance sensor is shorter than a distance threshold;
- a pressure sensor in the loading region, the loading detection circuit determining that the terminal is placed in the loading region if a pressure detected by the pressure sensor is larger than a pressure threshold; or
- a temperature sensor in the loading region, the loading detection circuit determining that the terminal is placed in the loading region if a temperature detected by the temperature sensor is higher than a temperature threshold.

12. The portable gimbal platform of claim 10, further comprising:
- a receiving circuit configured to receive a control message from the terminal, the control message including a control instruction and a connection identifier associated with the control instructions; and
- a sending circuit configured to send the control instruction to a device indicated by the connection identifier.

13. The portable gimbal platform of claim 10, wherein the connection message further includes:
- at least one switch state indicating whether the at least one device with the wireless connection function and carried by the portable gimbal platform is on or off.

14. The portable gimbal platform of claim 10, wherein the at least one device with the wireless connection function and carried by the portable gimbal platform includes at least one of:
- a camera, a lighting device, an infrared detector, a wind speed detector, an accelerometer, or a positioning device.

15. A terminal for communication connection processing, comprising:
- a monitoring circuit configured to monitor one or more broadcasted messages generated and broadcasted by a portable gimbal platform, each of the one or more messages including a loading flag being invalid or valid;
- a determining circuit configured to determine one of the one or more messages in which the loading flag has changed from invalid to valid as a connection message indicating the terminal is placed in a loading region of the portable gimbal platform configured to attach the terminal to the portable gimbal platform, wherein the terminal being placed in the loading region of the portable gimbal platform is detected by determining that an image of the terminal captured by a camera of the portable gimbal platform is larger than an area threshold; and
- a processing circuit configured to establish a communication connection with a device with a wireless connection function, carried by the portable gimbal platform, and indicated by a connection identifier in the connection message.

16. The terminal of claim 15, wherein the processing circuit is further configured to:
- establish a communication connection with one device with the wireless connection function, carried by the portable gimbal platform, and corresponding to a connection identifier associated with a switch state indicating that the one device is on.

17. The terminal of claim 15, wherein the processing circuit is further configured to, after establishing the communication connection with the device with the wireless connection function, carried by the portable gimbal platform, and indicated by the connection identifier:

record the connection identifier.

18. The terminal of claim 15, wherein the processing circuit is further configured to:

establish a communication connection with a device with the wireless connection function, carried by the portable gimbal platform, and indicated by a connection identifier that was previously recorded.

19. The terminal of claim 15, wherein the monitoring circuit is configured to monitor the broadcasted messages based on WiFi or Bluetooth connection.

20. A system for communication connection processing, comprising:

a portable gimbal platform including a loading region configured to attach a terminal to the portable gimbal platform;

at least one device with a wireless connection function and carried by the portable gimbal platform; and the terminal to be placed in the loading region, wherein:

the portable gimbal platform is configured to:

generate, in response to detecting the terminal is placed in the loading region, a connection message including:

at least one connection identifier each corresponding to one of the at least one device; and a loading flag that is configured as being valid for instructing the terminal to establish a communication connection; and broadcast the connection message; and the terminal is configured to:

monitor one or more broadcasted messages generated and broadcasted by the portable gimbal platform, each of the one or more messages including a loading flag being invalid or valid;

determine one of the one or more messages in which the loading flag has changed from invalid to valid as the connection message indicating the terminal is placed in the loading region of the portable gimbal platform, wherein the terminal being placed in the loading region of the portable gimbal platform is detected by determining that an image of the terminal captured by a camera of the portable gimbal platform is larger than an area threshold; and establish the communication connection with the one of the at least one device.

* * * * *